(12) United States Patent  
Davis

(10) Patent No.: US 9,723,814 B2  
(45) Date of Patent: *Aug. 8, 2017

(54) INTERNET CANINE COMMUNICATION DEVICE AND METHOD

(71) Applicant: Andrew Peter Davis, Bellevue, WA (US)

(72) Inventor: Andrew Peter Davis, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,066

(22) Filed: Jan. 5, 2016

(65) Prior Publication Data

US 2016/0174521 A1 Jun. 23, 2016

Related U.S. Application Data

(63) Continuation of application No. 13/765,546, filed on Feb. 12, 2013, which is a continuation of application No. 13/752,217, filed on Jan. 28, 2013, now Pat. No. 9,226,477.

(60) Provisional application No. 61/689,270, filed on Jun. 2, 2012.

(51) Int. Cl.
| | |
|---|---|
| *A01K 5/02* | (2006.01) |
| *A01K 15/02* | (2006.01) |
| *A01K 5/01* | (2006.01) |
| *H04N 7/14* | (2006.01) |

(52) U.S. Cl.
CPC .............. *A01K 5/02* (2013.01); *A01K 5/0114* (2013.01); *A01K 15/02* (2013.01); *A01K 15/021* (2013.01); *H04N 7/142* (2013.01)

(58) Field of Classification Search
CPC ........ A01K 5/02; A01K 5/0114; A01K 15/02; A01K 15/021
USPC ......................................................... 119/57.1
See application file for complete search history.

(56) References Cited

U.S. PATENT DOCUMENTS

| | | | | |
|---|---|---|---|---|
| 2006/0011145 | A1* | 1/2006 | Kates | A01K 15/021 119/719 |
| 2006/0208910 | A1* | 9/2006 | Tolner | A01K 15/021 340/573.3 |
| 2012/0024237 | A1* | 2/2012 | Rice | A01K 15/027 119/703 |
| 2012/0160176 | A1* | 6/2012 | Murphy | A01K 5/0114 119/57.1 |

* cited by examiner

*Primary Examiner* — Joshua Huson
(74) *Attorney, Agent, or Firm* — Lowe Graham Jones PLLC

(57) ABSTRACT

Enhanced methods and systems for human-pet communication are described. Example embodiments provide an Internet Canine Communication System ("ICCS"). The ICCS facilitates remote communication and interaction with between a dog and its owner, caretaker, trainer, family member, or the like. The ICCS may include a base station or similar device that is configured to deliver treats to a dog and to transmit audio/visual communication between the dog and a remote client device operated by a human user. The ICCS may also facilitate training the dog to utilize the ICCS to communicate with the user, such as by answering calls from or initiating calls to the remote client device of the user.

18 Claims, 11 Drawing Sheets

INTERNET CANINE COMMUNICATION DEVICE AND METHOD

PRIORITY CLAIM

This application is a continuation of U.S. patent application Ser. No. 13/752,217, filed Jan. 28, 2013, and U.S. patent application Ser. No. 13/765,546, filed Feb. 12, 2013, both of which claim the benefit of U.S. Provisional Application No. 61/689,270 filed on Jun. 2, 2012, each of which are incorporated herein by reference in their entireties.

FIELD OF THE INVENTION

This invention relates generally to systems, devices, and methods for communicating with a pet.

BACKGROUND

In the past few years, there has been a rapid advance and convergence of communication technologies which exploit the low cost and ubiquitous nature of Wi-Fi and the Internet. Low cost Internet cameras (e.g., Web cameras or "webcams") are configured to transmit live audio and video feeds over the Internet. Some Internet cameras allow remote control tilting and panning. Video "chat" services, such as Skype and Apple's Face Time, provide video communication with another person who has Internet access. One of the driving forces in the rapid progress and evolution of these communication technologies is our desire to keep in touch with family and friends.

This desire to communicate with family and friends also applies to one of the most important members of a typical family, the pet dog. A simple Internet camera to keep an eye on the family dog when he is home alone suffers from a number of drawbacks. As one example, Internet cameras and their associated computers typically cannot be controlled by typical dogs, as dogs cannot manipulate the requisite input devices, such as keyboards and/or mice. The advance of Internet communication technologies now make possible devices, systems, and methods to better communicate with family dogs.

BRIEF DESCRIPTION OF THE DRAWINGS

Example embodiments of the present invention are described in detail below with reference to the following drawings.

DETAILED DESCRIPTION

Embodiments described herein provide enhanced methods and systems for human-pet communication and, more particularly, for remote communication and interaction with between a pet and its owner, caretaker, trainer, family member, or the like. Example embodiments provide an Internet Canine Communication System ("ICCS"). Some embodiments of the ICCS include a device (e.g., base station, home device) that is configured to deliver treats to a dog and to transmit audio/visual communication between the dog and a remote client device operated by a human user.

Figure 1:
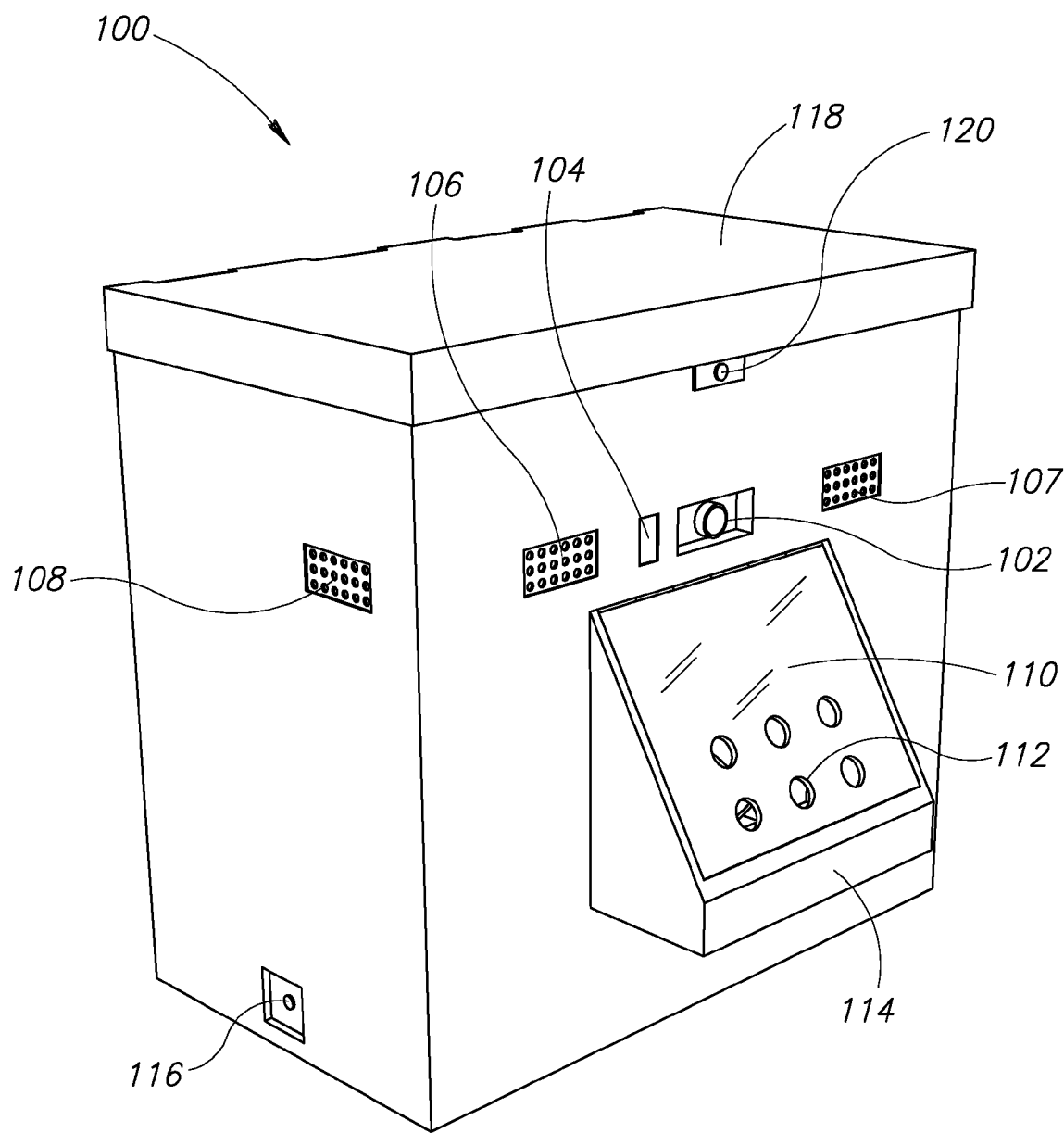
FIG. 1 is an isometric view showing the side, front, and top of an Internet Canine Communication System according to an example embodiment.

FIG. 1 is an isometric view showing the side, front, and top of an Internet Canine Communication System 100 according to an example embodiment. In FIG. 1, the ICCS 100 contains a video camera 102, a camera positioning lever 104, a microphone 106, and a speaker 107. The ICCS 100 also includes a food tray 114 and an activation cover 110. In this embodiment, the activation cover 110 is substantially transparent and includes open holes 112, so that the dog can both see and smell the presence of a treat in the food tray 114. In other embodiments, the activation cover 110 may be opaque and/or may not include holes 112. A small bell 108 and a training button 116 are located on the side of the ICCS 100. The ICCS 100 also includes a hinged top 118 and latch 120 for securing the hinged top 118 in the closed position. The speaker 107 and bell 108 are examples of audio output devices that may be used to communicate with the dog.

In this embodiment, the components of the ICCS 100 are arranged in a housing that is substantially in the shape of a rectangular prism. In other embodiments, other shapes may be used, including cylindrical, pyramidical, or the like. In some embodiments, the ICCS 100 may be built into the wall of a house or other structure (e.g., a cabinet, refrigerator).

Figure 2:
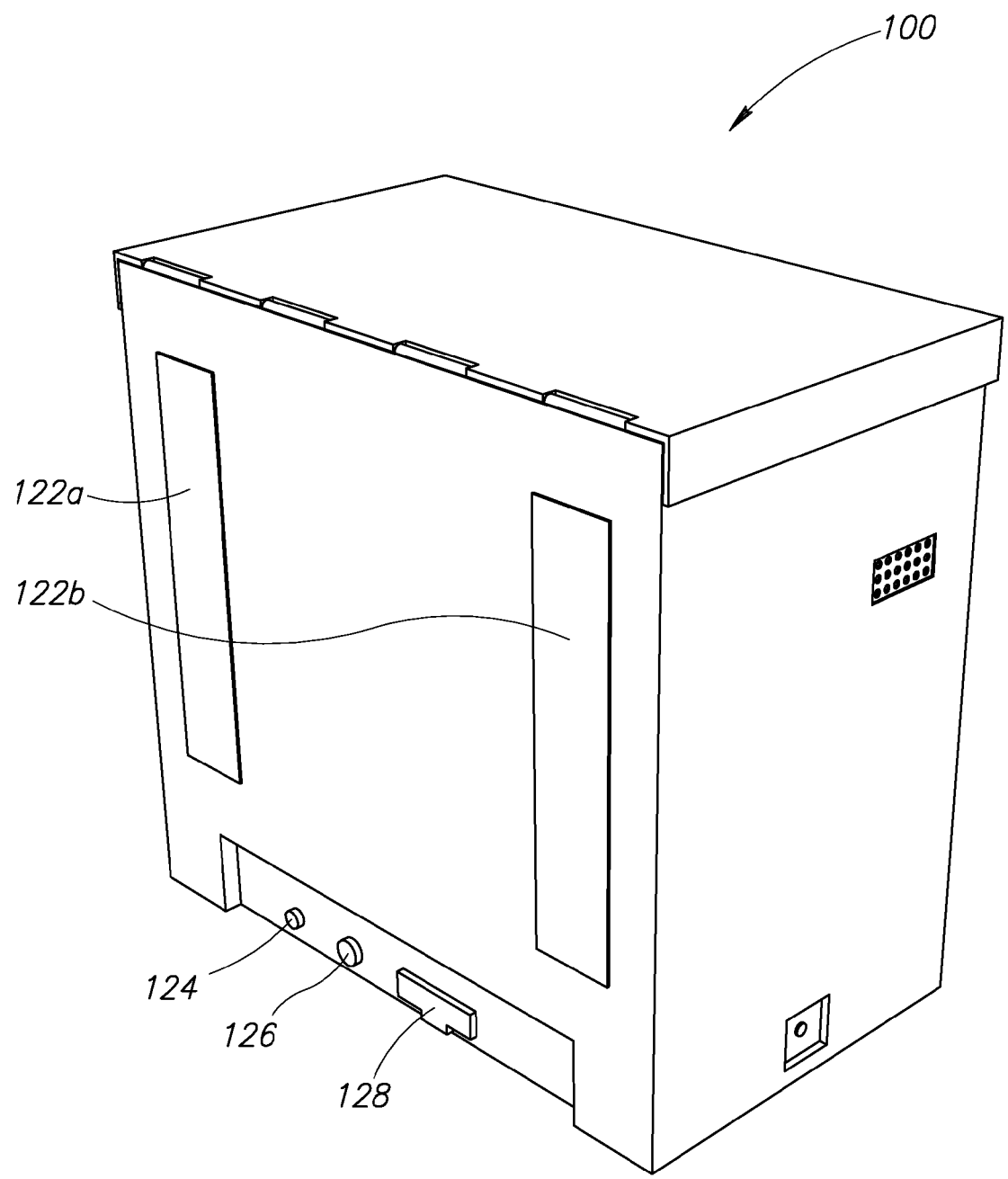
FIG. 2 is an isometric view showing the side, rear, and top of the example Internet Canine Communication System.

FIG. 2 is an isometric view showing the side, rear, and top of the example Internet Canine Communication System 100. In particular, FIG. 2 shows the back of the ICCS 100, with Velcro (e.g., hook and loop fastener) wall fasteners 122a and 122b. The ICCS 100 may be permanently or removably attached to a wall or other stable structure in other ways, including brackets, screws, magnets, or the like. Attaching the ICCS 100 to a wall or other stable structure is advantageous because even small dogs may be able to move, tip over, or otherwise disrupt the location, orientation, or operation of the ICCS 100. Also shown are connections or ports for power 124, Wi-Fi antenna 126 and Ethernet 128. Other or additional networking mechanisms may be supported, such as USB, FireWire, infrared, or the like.

Figure 3:
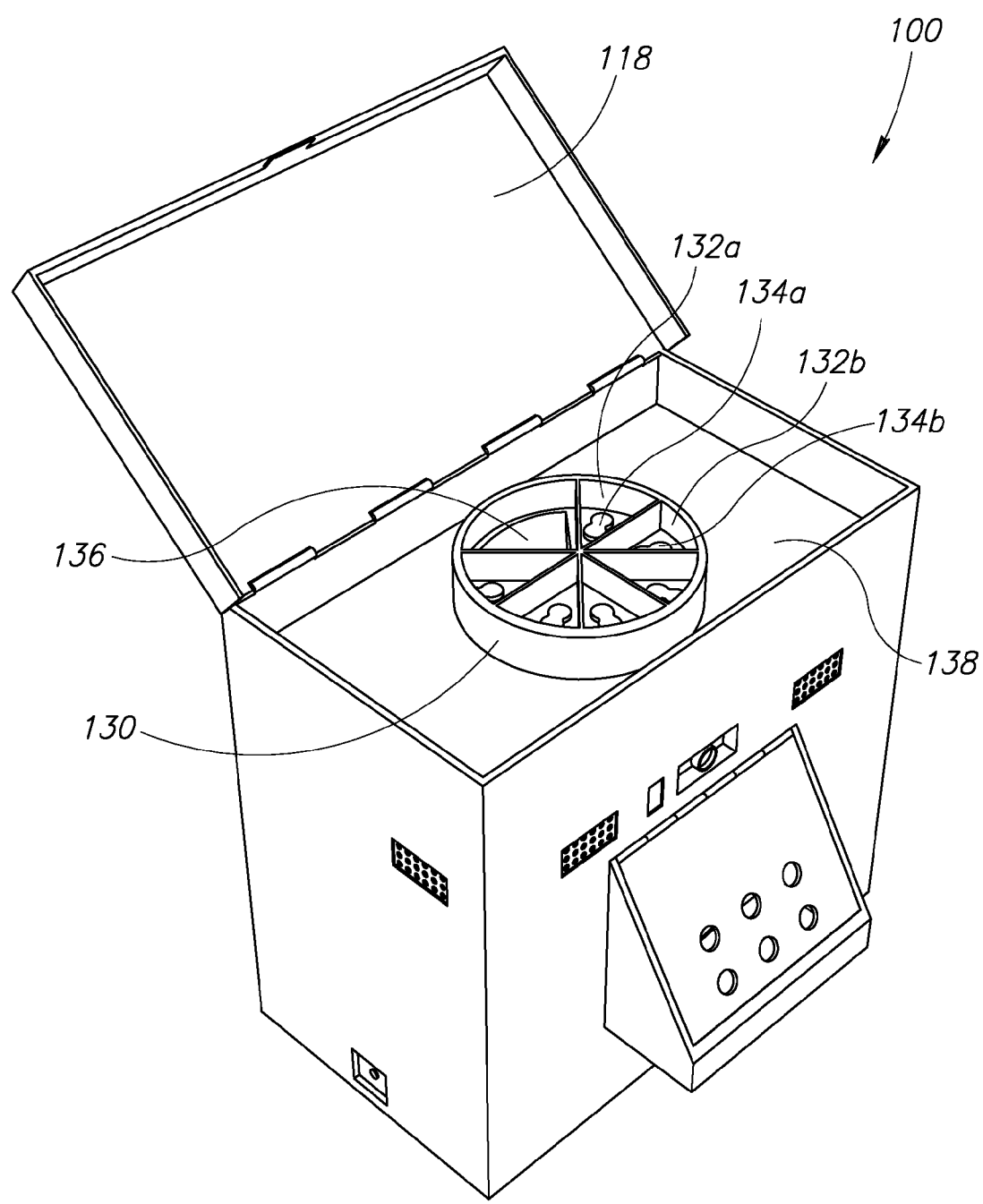
FIG. 3 is an isometric view illustrating a treat carousel of the example Internet Canine Communication System.

FIG. 3 is an isometric view illustrating a treat carousel of the example Internet Canine Communication System 100. FIG. 3 shows the ICCS 100 with its top 118 open, showing an open-bottom treat carousel 130 resting on a carousel floor layer 138. The treat carousel 130 contains multiple individual treat compartments, such as compartments 132a and 132b, each housing a respective treat 134a and 134b. An opening 136 in the carousel floor layer 138 is visible through the open-bottom carousel 130. In other embodiments, the ICCS 100 may include a treat bin. A treat bin may be any container configured to hold and dispense treats. One example treat bin is a container that includes an activatable door configured to open and release one or more treats stored in the bin, or a rotating vertical wheel with notches/baskets to dispense the treats. The carousel 130 (or one or more of its compartments) may also be considered a treat bin.

Figure 4:
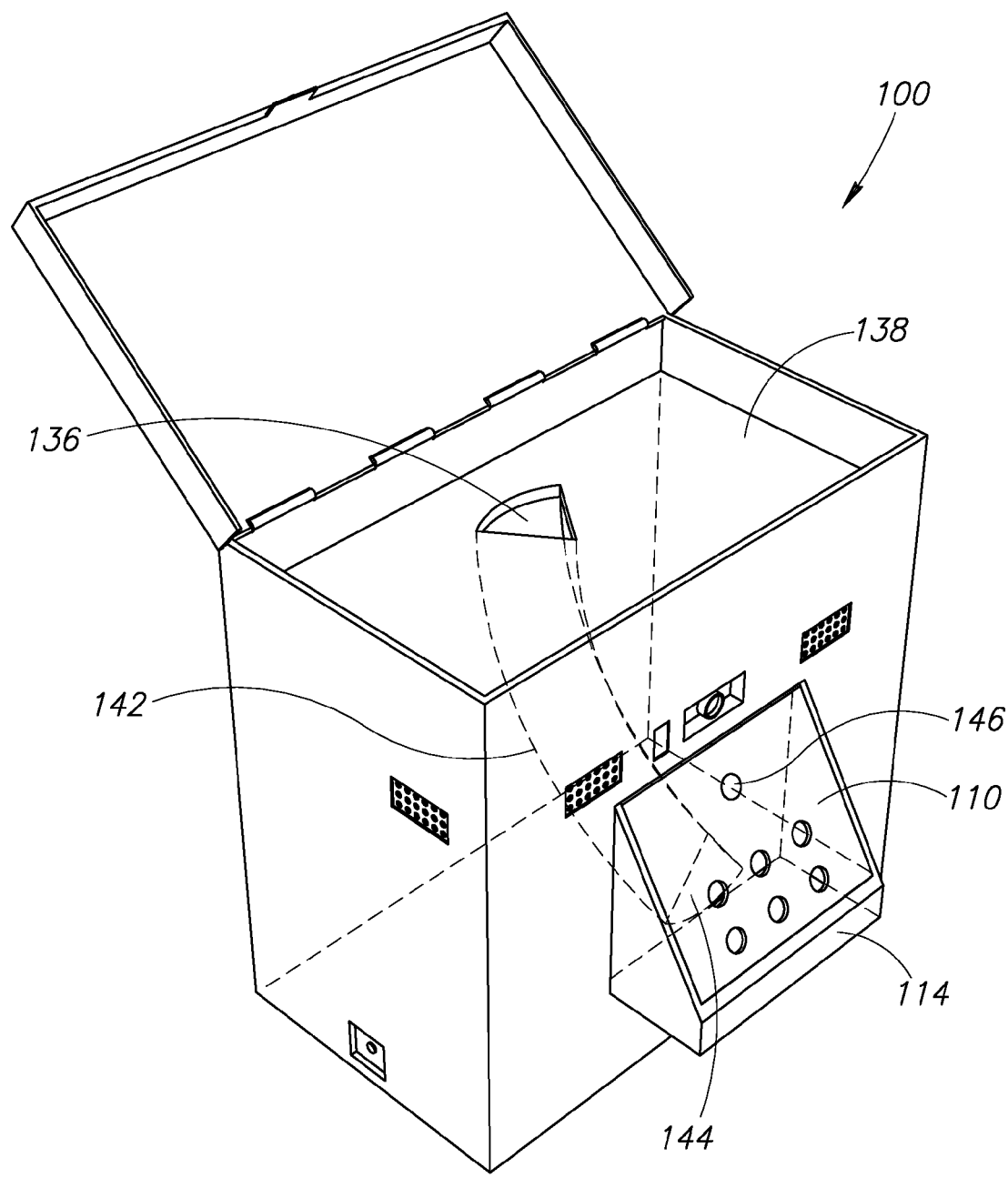
FIG. 4 illustrates a treat slide located in the interior of the example Internet Canine Communication System.

FIG. 4 illustrates a treat slide located in the interior of the example Internet Canine Communication System 100. FIG. 4 shows the carousel floor layer 138 with the carousel 130 removed. A treat passage (e.g., slide or chute) 142 connects the opening 136 in the carousel floor layer 138 with an opening 144 to the food tray 114. Also visible is a light 146 (e.g., an LED light), positioned so that it illuminates the food tray 114 and activation cover 110.

Figure 5:
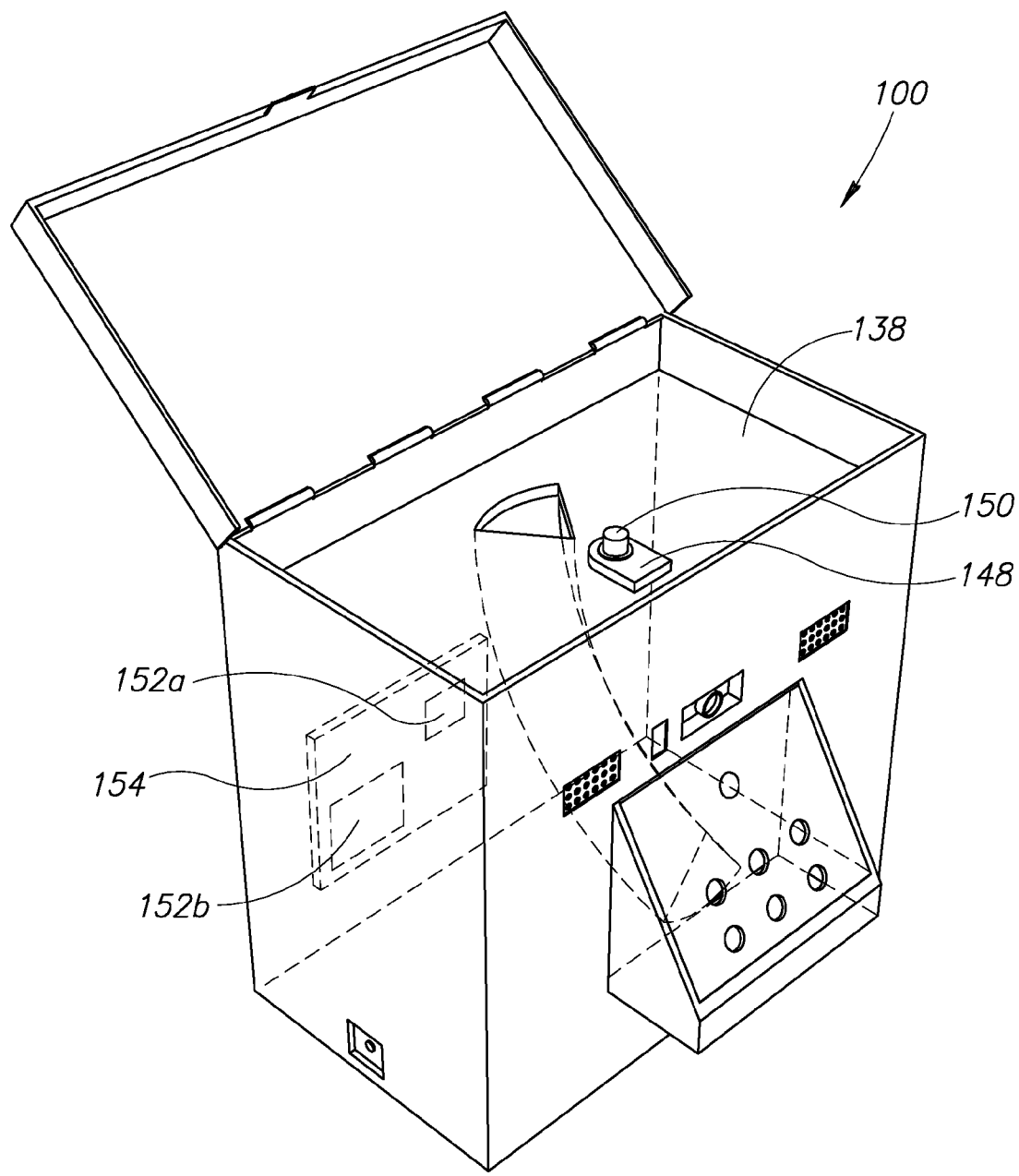
FIG. 5 illustrates a carousel motor located in the interior of the example Internet Canine Communication System.

FIG. 5 illustrates a carousel motor located in the interior of the example Internet Canine Communication System 100. FIG. 5 depicts the carousel motor 148 below the carousel floor layer 138. The carousel motor 148 includes a shaft 150 that protrudes through the floor layer 138. The shaft 150 is rotated by the carousel motor 148. The shaft 150 drives the rotation of the carousel 130. Also shown is a printed circuit board 154 and its microprocessors 152a and 152b. The circuit board 154 and its data processing modules may actuate the carousel motor 148 and/or other subsystems of the ICCS 100 in response to signals, commands, or other indications received via various input devices of the ICCS 100, including the training button 116, Wi-Fi antenna 126, Ethernet port 128, or the like.

Figure 6:
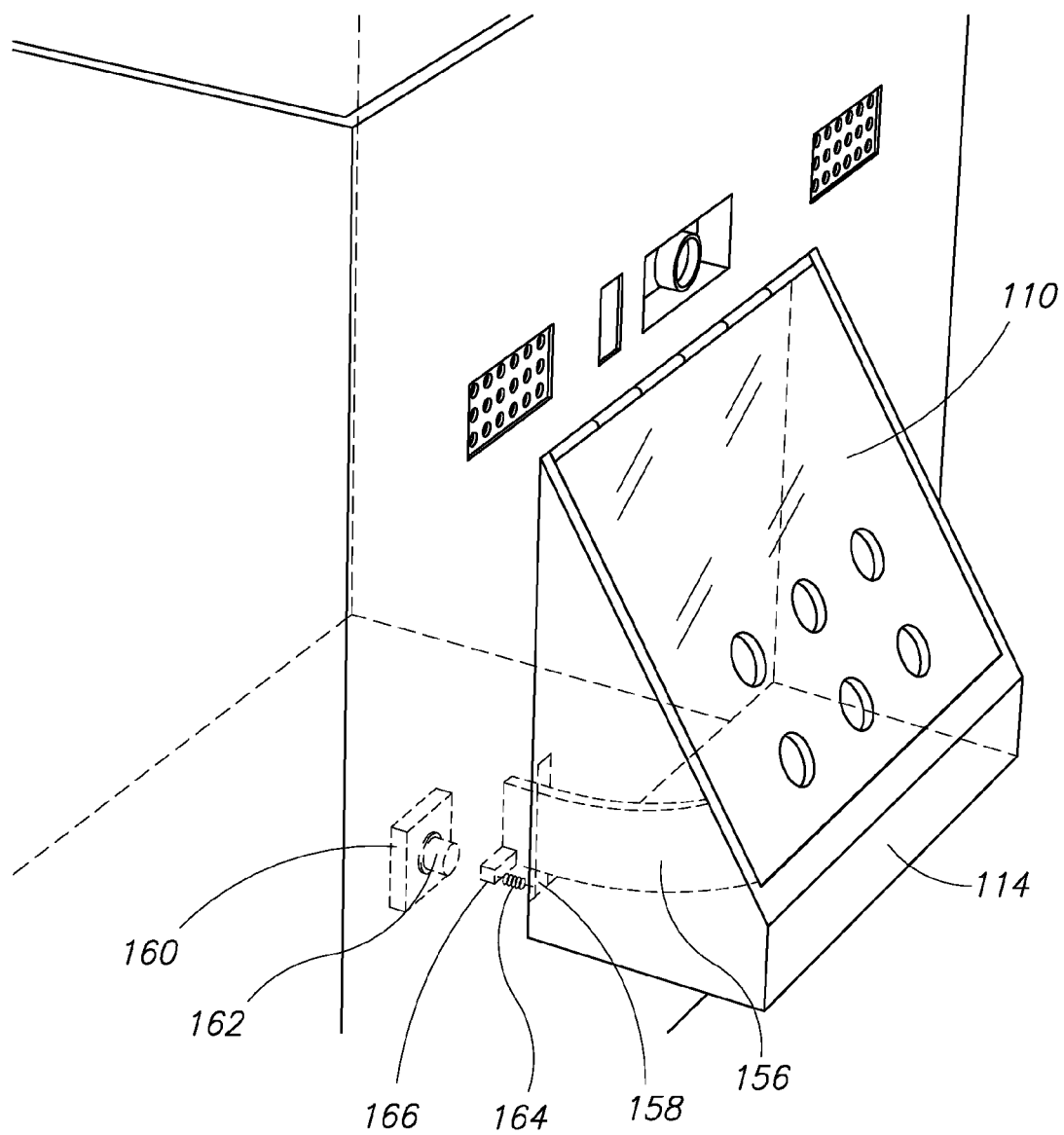
FIG. 6 illustrates the activation cover of the example Internet Canine Communication System.

FIG. 6 illustrates the activation cover 110 of the example Internet Canine Communication System. Visible in this view is an activator arm 156 that extends from the back of the activation cover 110 through a slot 158 in the back of the food tray 114 area towards an activator switch 160 having an activator button 162. An activator flange 166 protrudes from end of the activator arm 156, and is positioned so that it engages the activator button 162 as the activation cover 110 is pushed inward. A spring 164 is attached to the activator flange 166 and the wall of the ICCS 100 so that the activation cover 110 is kept in the forward (closed) position.

Figure 7:
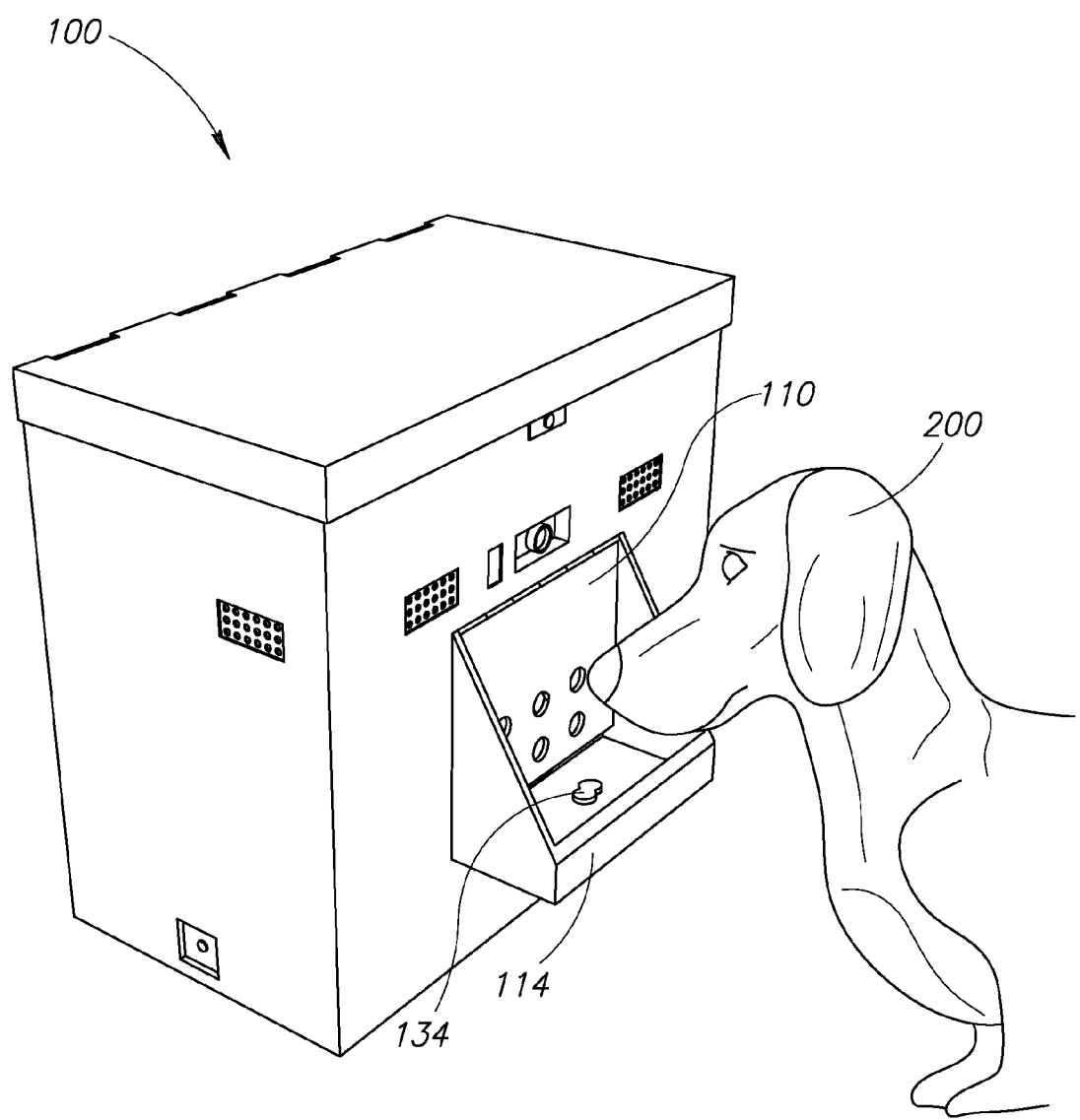
FIG. 7 illustrates operation of the example Internet Canine Communication System by a dog.

FIG. 7 illustrates operation of the example Internet Canine Communication System 100 by a dog. In particular, FIG. 7 shows a dog 200 pushing in the activation cover 110 with his nose (or paw) to get to the treat 134 in the food tray 114.

Figure 8:
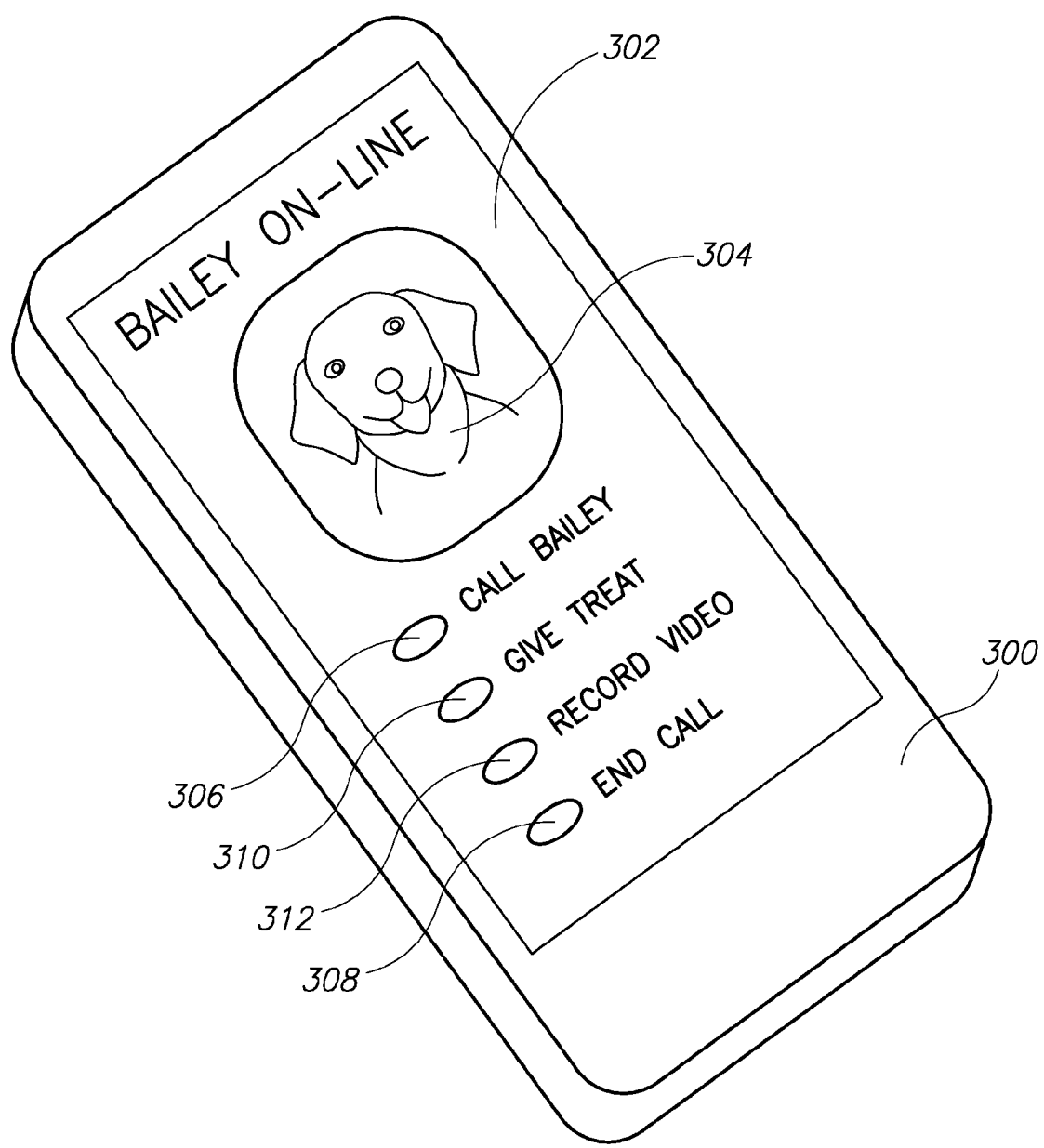
FIG. 8 illustrates a mobile client device according to example embodiments.

FIG. 8 illustrates a mobile client device according to example embodiments. In particular, FIG. 8 shows a mobile device 300 having a screen 302 for a mobile app for the ICCS 100. Image data such as a video 304 of the dog 200 is shown on the screen 302. The screen 302 also includes controls (e.g., touch-screen buttons) for interacting with the ICCS, including a call button 306, a deliver treat button 310, a record video button 312, and an end call button 308. The mobile device 300 may take other forms, such as a cell phone, smart phone, tablet computer, laptop computer, or the like. Other embodiments may provide client software for execution on other types of computers, such as desktop or kiosk-based systems.

To use the ICCS 100, a family member, pet owner, caretaker, or other user (e.g., trainer) first trains the dog to use the ICCS 100. The ICCS 100 is initially mounted on a wall or other suitable stable surface (e.g., cabinet, chest of drawers, computer table) using Velcro fasteners 122a and 122b, at a height that is appropriate for the size of the dog. The user next places treats 134 in each of the treat compartments 132 of the treat carousel 130, closes the top 118, and then secures the top 118 with the latch 120.

Next, with the dog in the room, the user pushes the training button 116 on the side of the ICCS 100. Pushing the training button 116 causes a treat delivery command or signal to be transmitted to a treat delivery subsystem or module of the ICCS 100, including those components that are involved in delivering a treat to the food tray 114, notifying the dog, and the like. More specifically, pushing the training button 116 activates the bell 108 and flashing light 146, and also activates the carousel motor 148 to rotate and advance the carousel 130 until the next treat compartment 132 is positioned above the opening 136 in the carousel floor layer 138. Upon rotation of the carousel 130, the treat 134 drops through the opening 136, down the treat slide 142, and onto the food tray 114. Transmission of the treat delivery command or signal may be direct (e.g., via hard wiring between the training button 116 and the carousel 130) or indirect (e.g., intermediated via a microprocessor or other data processing module).

While the bell 108 is ringing and the light 146 is flashing, the dog's attention is easily directed to the food tray 114, since the dog can see the treat through the activation cover 110, and can smell the treat through the holes 112. As shown in FIG. 7, the dog will soon learn that he can use his nose (or paw) to push open the activation cover 110 to reach the treat 134 in the food tray 114. As the dog pushes open the activation cover 110, the activation arm 156 is advanced through the slot 158, causing the activator flange 166 to contact the activator button 162, which turns off the bell 108.

The above training procedure, initiated by pressing the training button 116, can be repeated as often as necessary until the dog 200 is trained to push open the activation cover 110 every time he hears the bell 108. The final step in the training process is to push the training button 116 when the dog 200 is not in the room. It may take several repetitions (possibly initially requiring some other command to get the dog to come into the room), but the dog will soon learn to enter the room, approach the ICCS 100, and push the activation cover 110 to obtain a treat every time he hears the bell 108.

Before the ICCS 100 can be used to remotely communicate with the dog 200, it is first configured to interact with a user's mobile device 300. Some embodiments may include security and/or authentication (e.g., based on passwords, device identifiers, or the like), such that only authorized users can access the ICCS 100. In addition, the camera positioning lever 104 is used to adjust the camera angle to accommodate the size of the dog. Before leaving the house, the user also fills the treat compartments 132 and secures the top 118.

To use the ICCS 100, as shown in FIG. 8, the user activates client software (e.g., an "app") on their mobile device 300, and pushes the "call dog" button 306 visible on the screen 302. This causes a treat delivery command to be delivered to the treat delivery subsystem or module of the ICCS 100. In particular, pressing the call dog button 306 remotely activates the bell 108, light 146, and carousel motor 148. The carousel tray 130 rotates, sending a treat 134 onto the food tray 114. The dog 200 hears the bell 108, approaches the ICCS 100, and pushes the activation cover 110 to obtain his treat. Pushing the activation cover 110 engages the activation button 162, which in turn turns off the bell 108, and at the same time activates the camera 102 and microphone 106, thus allowing the dog to "answer" the phone (or "accept" the call). In another embodiment, the camera 102 and microphone 106 may be activated directly from the "call dog" button, rather than from the dog pushing the activation button 162. Image data (e.g., video or still images) obtained by the camera 102 is presented in the video window 304 of the mobile device screen 302.

Note that other embodiments may have different mechanisms or employ different techniques for delivering treats and determining when to turn off the bell 108. Some embodiments may, for example, eject a treat onto the floor or into a tray of the ICCS 100, and then determine to turn off the bell 108 (or other audio device of the ICCS) in response to an input received from the dog. An input may include pushing an activation cover 110 (as above), but may also or instead include a response lever or panel configured to make it easy for the dog to push with nose or paw, detecting motion (e.g., via a motion detector of the ICCS), detecting a sound (e.g., a bark detected via a microphone of the ICCS), detecting heat (e.g., via an infrared sensor), or the like. Some embodiments thus may not include one or more of the components related to determining when the treat has been taken, such as the activation cover 110, and the like.

Once the dog has accepted the call, the user can further interact with the dog. The user can speak to the dog through the speaker 107, and give additional rewards by pressing the "give treat" button 310 on the mobile app. Pushing the "give treat" button 310 activates the rotation of the carousel and rings the bell, in a similar fashion to the "call dog" button 306, allowing the dog to receive additional treats during the call. Finally, at the end of the interaction with the dog 200, the user presses the "end call" button 308 on the mobile app. This turns off the camera 102, microphone 106, and light 146, thereby resetting the ICCS 100 for the next call. The "record video" button 312 allows the family member to record entertaining or memorable video received during a call.

Other embodiments of the ICCS may include the option to allow the ICCS to be used as a simple remote camera, along with remote panning and zooming. Other embodiments of the ICCS may include multiple treat chutes and/or trays, so that the dog is not sure which platter, tray, or position the treat will go to. Having multiple treat trays achieves entertaining movements of the dog's head and eyes visible on the video during the call. In addition, a toy such as a spinning dial or moving object, activated by the mobile device client app and positioned near the camera on the ICCS, makes the dog's excitement visible on the video, as well as helps direct the dog's attention to the camera. Interesting toys or puzzle accessories may be attached to the ICCS, or linked remotely to the ICCS, in order to present to additional challenges or games for the dog to get to a treat while being viewed on the app. In addition, recorded videos may be shared on line with other family members and others in an online ICCS community.

Note that while operation of the ICCS is herein primarily described with respect to a pet dog, other embodiments may be configured to operate with other types of pets or animals (e.g., in a zoo or scientific study). For example, one embodiment may provide an Internet Feline Communication System that dispenses food treats, cat toys, and/or catnip to cause the cat to interact with the system. The Internet Feline Communication System may also or instead present audio/video of birds or other animals to attract a pet cat's attention.

Figure 9:
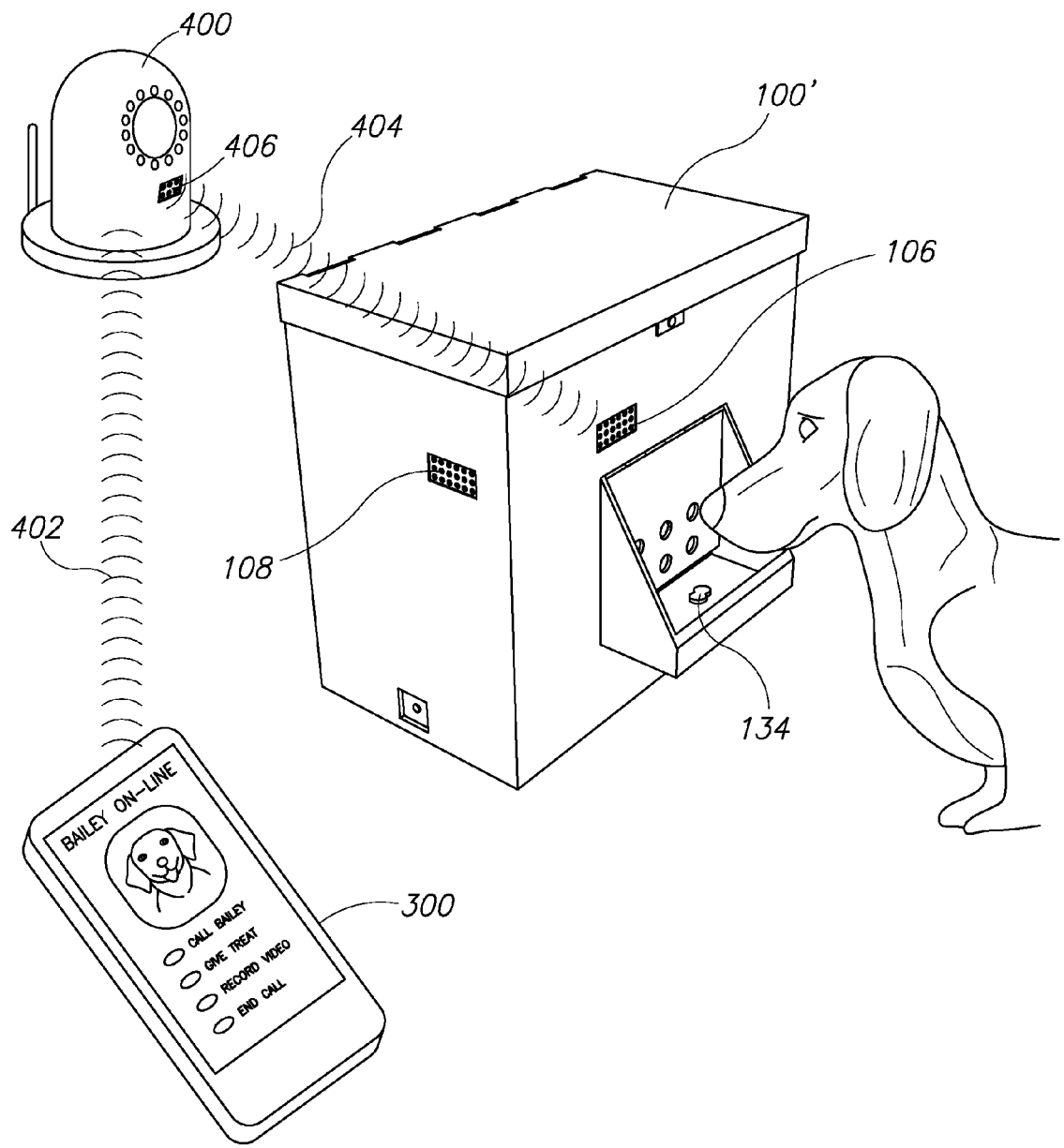
FIG. 9 illustrates interacting via a Web camera with an Internet Canine Communication System according to an example embodiment.

FIG. 9 illustrates interacting via a Web camera with an Internet Canine Communication System according to an example embodiment. This embodiment provides an ICCS 100' that is similar to the ICCS 100 described above, except that it does not include at least some of the audio and/or video capabilities in the base station (e.g. the housing that performs treat delivery). More specifically, the ICCS 100' is located proximate to Web camera ("webcam") 400 already installed at a residence or other location. The webcam 400 includes a speaker 406. To use the ICCS 100', a mobile app on the user's mobile device 300 transmits (e.g., via an Internet connection) a specific encoded audio signal 402 to the webcam 400. The signal 402 is received by the webcam 400 and is then played via the speaker 406 as audio signal 404. The microphone 106 on the ICCS 100' then receives and processes the audio signal 404, activating the ICCS 100' to ring the bell 108 and deliver a treat 134. The webcam 400 performs the video and audio transmission functions performed by the camera 102 and speaker 107 of the ICCS 100 described above.

In the embodiment of FIG. 9, the ICCS 100' does not have a network connection to the webcam 400. Instead, the ICCS 100' receives commands or signals from the webcam 400 that are transmitted as sound waves by the speaker 406 of the webcam 400. The ICCS 100' is configured to function with any networked (e.g., Internet, intranet, cellular) video camera that includes an audio output facility as long as the transmitted audio signal 404 is strong or loud enough for the ICCS 100' to detect it. In addition, being able to position the ICCS 100' some distance away from the webcam 400 gives greater flexibility in generating more interesting and dynamic videos of the dog as he interacts with the ICCS 100'.

Another embodiment of the ICCS may bypass some or all of the electronics and programming associated with providing audio/video communication by using conventional video conferencing software (e.g., Skype) and/or devices, such as the webcam 400 described above. For example, a desktop computer installed in the same room as the ICCS may include an attached webcam and speakers and have installed video conferencing software that is configured to transmit video and/or audio between the room and a remote client device. In other embodiments, the ICCS may itself include a computer processor that is configured to run a stock or customized video conferencing client. Such approaches potentially lower the cost of producing an ICCS by reducing or eliminating some of the data processing functions and/or software requirements included in the treat delivery housing.

Figure 10:
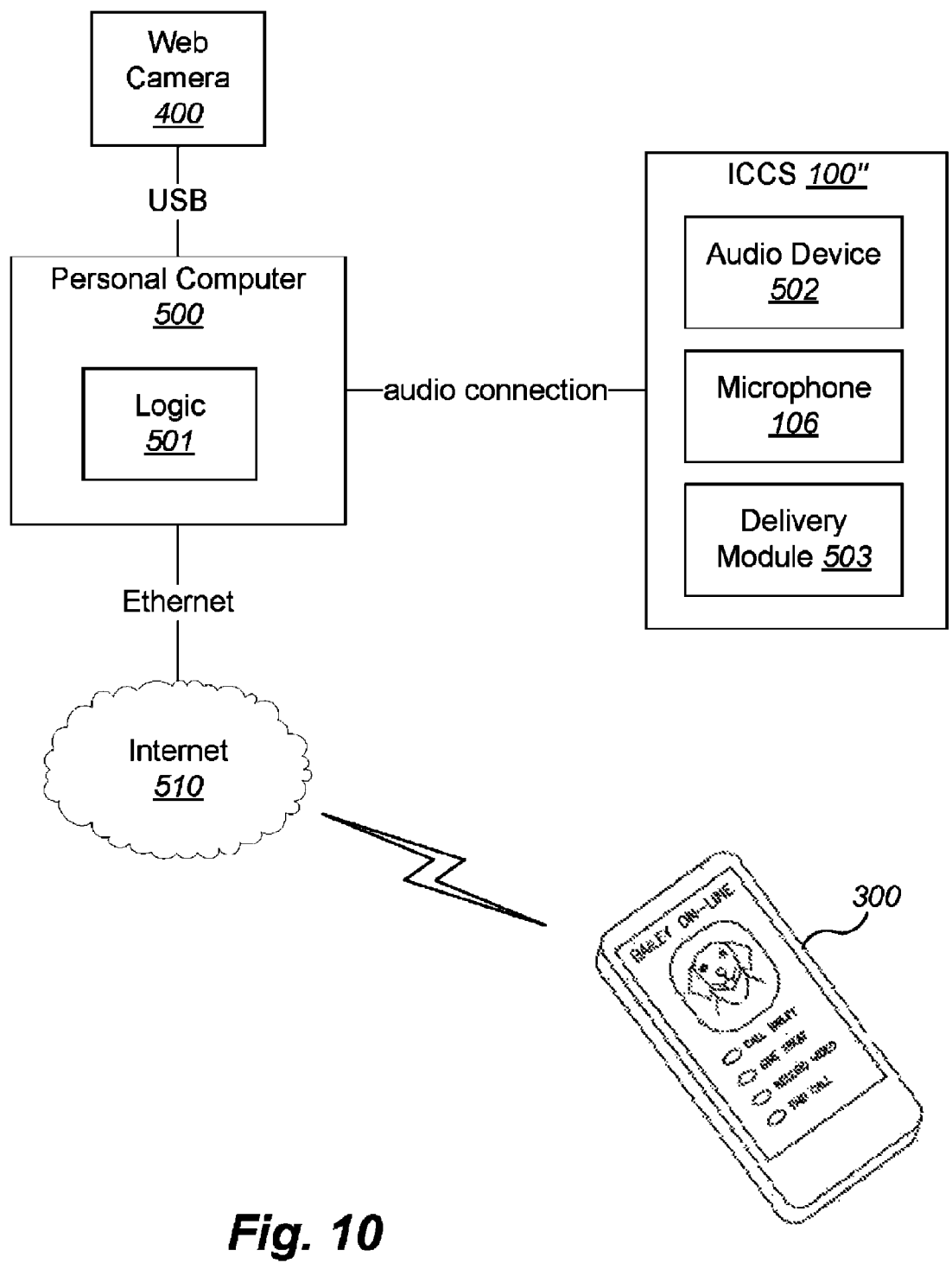
FIG. 10 illustrates an Internet Canine Communication System according to another example embodiment.

FIG. 10 illustrates an Internet Canine Communication System according to another example embodiment. In particular, FIG. 10 depicts an ICCS 100" that is a variation of the ICCS 100 and 100' described above. The ICCS 100" includes an audio device 502, such as bell, speaker, or other audio output device. The ICCS 100" also includes a microphone 106 and a treat delivery module 503. The treat delivery module 503 includes a mechanism (e.g., including one or more of a carousel, slide, bin, actuator, motor) for delivering treats in response to a received command or signal.

Also shown is a personal computer 500 (e.g., a laptop or desktop computer) that is communicatively coupled via a USB or similar connection to a webcam 400. In other embodiments, the personal computer 500 and the webcam 400 are in wireless communication. The personal computer 500 is also communicatively coupled to a mobile device 300 via the Internet 510 or other communication network.

The personal computer 501 includes logic 501 that is configured to communicate with the mobile device 300, the webcam 400, and the ICCS 100". In particular, the logic 501 is configured to receive inputs from the mobile device 300 and to forward them (or signals based thereon) to the ICCS 100". The logic 501 is also configured to receive video/audio data from the webcam 400 and forward it to the mobile device 300.

In one embodiment, the logic 501 may be video conferencing software (e.g., Skype) that is configured to ring or play some other tone or sound in response to an incoming call from a video conferencing app executing on the mobile device 300, or able to receive voice or sound commands from the mobile device 300. The logic 501 plays the ring or other sound via the audio connection to the ICCS 100". For example, if the audio connection is a cable to the ICCS 100", the sound may be played via the audio device 502 and then detected by the microphone 106. In another configuration, the logic 501 plays the sound via a speaker of the personal computer 500, such that the sound can be detected by the microphone 106 of the ICCS 100". In general, after the logic 501 automatically answers an incoming call, the ICCS 100" may be activated in one or more of the following ways: a sound initiated by the logic 501 and played by the audio device 502; a sound initiated by the mobile device 300 (e.g., in response to a button pressed by a user), received by the logic 501, and then played by the audio device 502; a spoken command uttered by the user of the mobile device 300, transmitted to the logic 501, and then played by the audio device 502. Any of these sounds (or other ones generated in other ways) can then be detected by the microphone 106, causing activation of the ICCS 100" as described further below. In some embodiments, the ICCS 100" includes logic (e.g., software, hardware, and/or firmware) to recognize spoken commands received via the microphone 106. The recognition logic may be a speech recognizer that is configured to recognize specific words, phrases, speakers (e.g., to differentiate between different users based on features of their voices), and the like.

In response to the sound detected by the microphone 106, the ICCS 100" causes the delivery module 503 to dispense a treat and/or causes the audio device 502 to play a sound (e.g., a whistle or bell) that calls the dog. Concurrently, the logic 501 automatically answers the incoming call, and begins to transmit audio/video captured by the Web camera 400 to the mobile device 300. The logic 501 may also receive audio/video from the mobile device 300, and play it via a display or speaker of the personal computer 500 or the audio device 502 of the ICCS 100".

During the communication session, the user of the mobile device 300 may transmit other commands to the ICCS 100." For example, the user may press keys or other input controls that generate sounds or issue a voice command word, that are configured, when played by the personal computer 500, to cause the ICCS 100" to perform certain functions, such as delivering a treat, making a sound, shaking a toy, or the like.

As noted, the logic 501 and the corresponding client software on the mobile device 300 may be standard video conferencing software. In other embodiments, the logic 501 and client on the mobile device client 300 may be custom software. For example, the logic 501 may be configured to respond to dial tones (e.g., DTMF tones) generated by the mobile device and to forward those tones (or signals/commands based thereon) to the ICCS 100". Other hardware arrangements are also contemplated. For example, the webcam 400 may be incorporated into the personal computer 500, such as is often the case with laptops or tablet computers.

Another embodiment of the ICCS provides an outgoing call feature. More specifically, the ICCS may provide and implement a protocol for allowing the dog or other pet to call or videoconference with family members or other persons. A sound and/or visual cue is programmed in the ICCS to activate at a certain time or time interval. This sound can be distinct from the sound indicating an incoming call. For example, a softer sound or visual cue can catch the dog's attention when the dog wanders into the room, rather than a louder sound indicating an incoming call that needs to be heard throughout the house and answered immediately. During the "outgoing call period" the dog is trained to push the treat door (or another door or button), and receive a treat. Alternatively, the treat can be dispensed when the outgoing call period begins. Operation of the treat door by the dog activates ICCS to initiate an outgoing call to a designated user (or users). Once the outgoing call is accepted by the user, the user can interact and give treats as described with respect to incoming calls, above. It should be noted that the dog gets a treat for initiating the call during the outgoing call period, even if the call is not answered by the user. If the dog activates the treat door at other periods, no treat is given. In some embodiments, once the dog initiates an outgoing call during the outgoing call period, the period is ended; this way, the dog cannot repeatedly make a call in order to obtain more treats.

Embodiments of the ICCS may also provide various training-related techniques. For example, a disembodied voice coming from the ICCS may be confusing to the dog, since it sounds quite different to the dog than a "live voice", and since it is disassociated from the smell and sight of the person speaking. For this reason, the dog may need to re-learn his established repertoire of tricks in response to a new set of speaker commands. One process for training tricks with the ICCS involves having the dog hear both the sound of a person's live voice and the sound of the person's voice thru the speaker of the ICCS. This process may be effectuated by having the user give commands via a mobile client device while in the room with the dog and the ICCS. Thus, the dog will hear both the user's voice live and via the speaker of the ICCS at the same time. Over time, the user can move further and further away from the ICCS while uttering a command, causing the commands played via the ICCS speaker to become more dominant. Alternatively, the user can cause (e.g., via the mobile client device) the commands played via the ICCS speaker to become louder (e.g., at increased volume), such as by pressing an appropriate input on the mobile client device, thereby causing the commands played via the ICCS speaker to become more dominant.

In another training process, the ICCS includes an audio recording function, which can be used to record commands for training purposes. The user can use a mobile client device (or controls on the ICCS) to play recorded commands via the ICCS speaker. The user can further reinforce such commands with a live voice to the extent necessary to train the dog to do tricks in response to commands played by the ICCS speaker.

In some embodiments, the treat carousel of the ICCS is configured to facilitate selection of a specific treat for the pet. For example, the user of a mobile client device may specify a particular treat compartment or treat type by way of a remote command. In response to receiving the command, the ICCS rotates the treat carousel to the selected compartment and delivers a treat therefrom. In this manner, the ICCS may facilitate the delivery of different types of treats to the pet.

Figure 11:
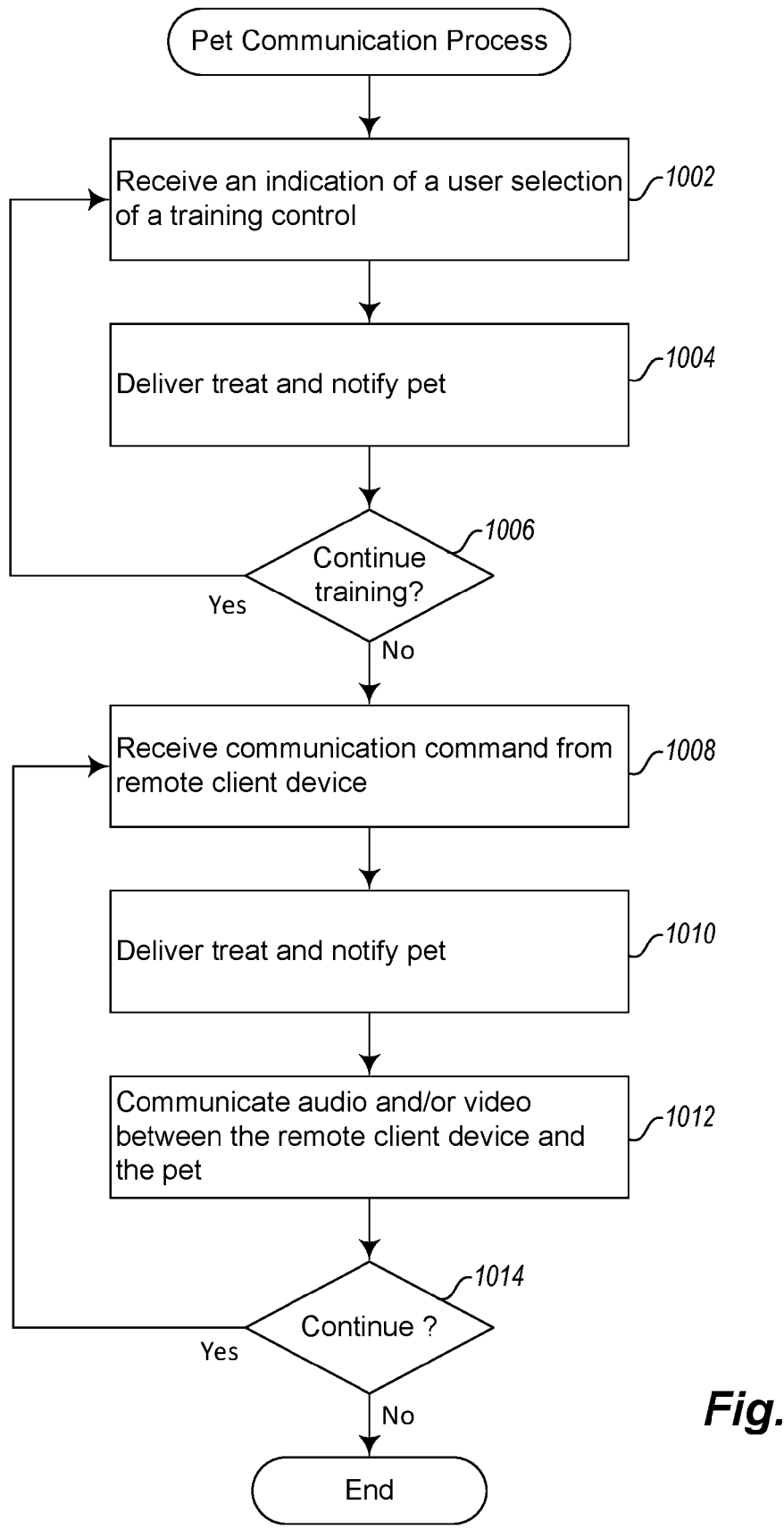
FIG. 11 is a flow diagram that illustrates a process for communicating with a pet according to an example embodiment.

FIG. 11 is a flow diagram that illustrates a process for communicating with a pet according to an example embodiment. The illustrated process may be performed by embodiments of the ICCS, described above.

In blocks 1002-1006, the process operates in a training mode, during which the pet is trained to interact with the ICCS. More specifically, the process begins at block 1002, where it receives an indication of a user selection of a training control. As discussed above, the ICCS may include a training control such as a button or switch, or circuitry/logic to receive voice command words from the trainer in the room, or from the mobile device. The training control may also or instead be situated on a remote client device operated by a user, and thus transmitted from the client device to the ICCS base station.

At block 1004, the process delivers a treat and notifies the pet. In response to receiving the indication of the selection of the training control, the process may transmit a delivery command to a delivery module in the ICCS base station or housing. The treat delivery module may include logic and/or mechanical elements (e.g., treat carousel, carousel motor, treat slide) configured to deliver a treat to a food tray, initiate a sound (e.g., play an audio signal, ring a bell, cause a local or remote audio device to output a sound) to notify the pet of the presence of a treat in the food tray, and stop playing the audio signal when the pet accesses the food tray to obtain the treat.

At block 1006, the process determines whether to continue training. If so, the process returns to block 1002 to await another selection of the training control; otherwise the process continues with block 1008.

In blocks 1008-1014, the process operates in a communication mode, in which it facilitates communication between the pet and a user operating a remote client device. More specifically, at block 1008, the process receives a communication command from a remote client device. The communication command may be a network packet, request, or other signal received via a networking interface of the ICCS. In other embodiments, the communication command may be a sound (e.g., audio signal) received from a speaker of a nearby webcam or other videoconferencing apparatus (e.g., a PC with attached speakers and camera; a laptop with integral speakers and camera).

At block 1010, the process delivers a treat and notifies the pet. Delivering the treat and notifying the pet may include transmitting the delivery command, as discussed above with respect to block 1004.

At block 1012, the process communicates audio and/or video between the remote client device and the pet. Communicating the audio and/or video may include transmitting audio and/or video of the pet to the remote client device in addition to receiving and presenting audio and/or video of the user received from the remote client device. The communication may be performed by communication modules that are integral to the ICCS housing (e.g., as shown in FIG. 1) and/or by communication modules that are separate from the treat delivery portion of the ICCS (e.g., as shown in FIG. 9 or 10).

At block 1014, the process determines whether to continue. If so, the process returns to block 1008 to await receipt of another communication command. If not, the process ends. For example, if an end call signal or command is received from the client device, the process may return to block 1008 to await the next call. Alternatively, the process may receive a shutdown signal or command, in which case the process ends.

The process of FIG. 11 and the other processes or functions described herein may be performed at least in part by conventional computer hardware and software arrangements. For example, the described processes may be performed by the microprocessors 152a and/or 152b. Microprocessors 152 may each include a memory, central processing unit ("CPU"), input/output devices or ports, and the like. Memory may be or include any computer-readable media, including as volatile or non-volatile memory, such as RAM, ROM, Flash memory, magnetic storage, optical storage, and the like. Some embodiments may store in memory instructions or other contents that are configured, when executed by a CPU or other processing unit, to perform one or more of the described processes. Some embodiments may implement one or more of the described processes by way of fixed or configurable hardware arrangements including as application specific integrated circuits, field-programmable gate arrays, programmable logic arrays, or the like.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "includes," "including," "comprises," and "comprising" should be interpreted as referring to elements, components, or steps in a non-exclusive manner, indicating that the referenced elements, components, or steps may be present, or utilized, or combined with other elements, components, or steps that are not expressly referenced. Where the written description and/or claims refer to at least one of something selected from the group consisting of A, B, C . . . and N, the text should be interpreted as requiring at least one element from the group (A, B, C . . . N), rather than A plus N, or B plus N, etc.

U.S. Provisional Application No. 61/689,270, filed Jun. 2, 2012 and entitled "INTERNET CANINE COMMUNICATION DEVICE" and U.S. patent application Ser. No. 13/752,217, filed Jan. 28, 2013 and entitled "INTERNET CANINE COMMUNICATION DEVICE AND METHOD" are incorporated herein by reference in their entireties. Where a definition or use of a term in an incorporated reference is inconsistent with or contrary to the definition or use of that term provided herein, the definition or use of that term provided herein governs.

While one or more embodiments of the invention have been illustrated and described above, many changes can be made without departing from the spirit and scope of the invention. Accordingly, the scope of the invention is not limited by the disclosure of specific embodiment. Instead, the invention should be determined entirely by reference to the claims that follow.

The embodiments of the invention in which an exclusive property or privilege is claimed are defined as follows:

1. A method for interacting with a pet, comprising:
   providing a system for communicating with a pet from a user of a communication device, the system including a treat dispenser for delivery of treats to a pet, a personal computing device in communication with the treat dispenser and further comprising a processor for sending and receiving communication commands, and a speaker in proximity to the treat dispenser;
   training the pet to answer a call from the user by:
      playing an audio signal via the speaker;
      causing one of the treats to be delivered from the treat dispenser to the pet; and
      stopping the play of the audio signal;
   training the pet to respond to spoken commands of a user when played via the speaker by, when the user is in the room with the treat dispenser:
      playing audio of a spoken command via the speaker in time proximity to when the user utters the spoken command so that the pet hears and associates the spoken command played by the speaker and the spoken command uttered by user; and causing one of the treats to be delivered from the treat dispenser to the pet; and communicating with the pet by:

calling the pet by playing an audio signal;

playing from the speaker of the system the spoken command uttered by the user;

transmitting, via a video conferencing program executing on the personal computing device, at least one of audio or video of the user of the communication device;

transmitting, via the video conferencing program executing on the personal computing device, at least one of audio or video of the pet to the communication device;

receiving at the system a communication command;

recognizing the communication command; and in response to the communication command, causing one of the treats to be delivered from the treat dispenser to the pet.

2. The method of claim 1, wherein the treat dispenser includes multiple food trays that are each configured to deliver treats to the pet, and further comprising:

receiving from the communication device a selection of one of the multiple food trays; and in response to the received selection, delivering a treat to the selected food tray.

3. The method of claim 1, wherein the treat dispenser has an associated toy that is moveable in response to commands received from the communication device, and further comprising:

receiving from the communication device a command to move the toy; and in response to the received command, causing the toy to move.

4. The method of claim 1, further comprising facilitating outgoing calls from the pet to the communication device, by:

initiating a sound to indicate a preselected outgoing call time period during which the pet may initiate a call to the communication device;

during the preselected outgoing call time period, receiving an indication that the pet has selected a control of the treat dispenser; and in response to the received indication, initiating an outgoing call to the communication device, the outgoing call including transmitting live audio or video of the pet.

5. The method of claim 4, further comprising during the preselected outgoing call time period, delivering a treat, wherein receiving the indication that the pet has selected the control of the treat dispenser includes receiving an indication that the pet has accessed the treat.

6. The method of claim 4, wherein facilitating outgoing calls from the pet to the communication device includes in response to the received indication, providing the pet with a treat, thereby rewarding the pet for initiating the outgoing call.

7. The method of claim 1, wherein training the pet to respond to spoken commands of the user includes:

recording the spoken commands via an audio input device; and playing one of the recorded spoken commands via the speaker.

8. The method of claim 1, wherein the communication command is a spoken command uttered by a user of the communication device, the spoken command played by the personal computing device via the speaker.

9. The method of claim 1, wherein the communication command is a verbal command from the user, and the system further comprising an audio input device configured to receive the communication command.

10. The method of claim 1, wherein the audio signal is played from one of an audio signaling device or the speaker.

11. The method of claim 1, wherein the audio signal is played continuously until receipt of input from the pet.

12. A method for interacting with a pet, comprising:

providing a system for communicating with a pet from a user communication device, the system including a treat dispenser, having a pet detection mechanism for detecting input from the pet, video conferencing software, command recognition logic, and an audio/video device;

configuring the command recognition logic to recognize a communication command received at the pet communication system from the communication device;

training the pet to obtain a treat from the treat dispenser by:

playing an audio signal that notifies the pet of the availability of a treat;

playing audio of a spoken command via the audio/video device in time proximity to when the user utters the spoken command so that the pet hears and associates the spoken command played by the audio/video device with the spoken command uttered by the user; and causing one of the treats to be delivered from the treat dispenser to the pet;

receiving, via the video conferencing software, an incoming call from the communication device;

recognizing, by the command recognition logic, the communication command from the communication device to the treat dispenser;

in response to the communication command, playing an audio signal via the audio/video device to notify the pet of the availability of a treat; and dispensing a treat to the pet; and in response to input from the pet, initiating transmission to the communication device of at least one of audio or video of the pet.

13. The method of claim 12, further comprising connecting a computing device to the treat dispenser, the computing device executing the video conferencing software, wherein the computing device is connected to the treat dispenser via at least one of a cable or wireless connection.

14. The method of claim 12, further comprising facilitating outgoing calls from the pet to the communication device, by:

initiating a sound to indicate a preselected outgoing call time period during which the pet may initiate a call to the communication device;

during the preselected outgoing call time period, receiving an indication that the pet has selected a control of the treat dispenser; and in response to the received indication, initiating an outgoing call to the communication device, the outgoing call including transmitting live audio or video of the pet.

15. The method of claim 14, further comprising during the preselected outgoing call time period, delivering a treat, wherein receiving the indication that the pet has selected the control of the treat dispenser includes receiving an indication that the pet has accessed the treat.

16. The method of claim 14, wherein facilitating outgoing calls from the pet to the communication device includes in response to the received indication, providing the pet with a treat, thereby rewarding the pet for initiating the outgoing call.

17. The method of claim 12, wherein training the pet to obtain a treat from the treat dispenser by playing the spoken command speaker includes:
  recording the spoken command via an audio input device; and
  playing the spoken command via the audio/video device.

18. The method of claim 12, wherein the treat dispenser includes multiple food trays that are each configured to deliver treats to the pet, and further comprising:
  receiving from the communication device a selection of one of the multiple food trays; and
  in response to the received selection, delivering a treat to the selected food tray.

* * * * *

UNITED STATES PATENT AND TRADEMARK OFFICE
CERTIFICATE OF CORRECTION

PATENT NO. : 9,723,814 B2  Page 1 of 1
APPLICATION NO. : 14/988066
DATED : August 8, 2017
INVENTOR(S) : Andrew Peter Davis It is certified that error appears in the above-identified patent and that said Letters Patent is hereby corrected as shown below:

In the Claims

In Column 12, Line 14 (Claim 12), remove the ",".

In Column 13, Line 8 (Claim 17), remove "speaker".

Signed and Sealed this
Third Day of October, 2017

Joseph Matal
*Performing the Functions and Duties of the*
*Under Secretary of Commerce for Intellectual Property and*
*Director of the United States Patent and Trademark Office*